Feb. 17, 1925.
M. FRENCH
NUTCRACKER
Filed Jan. 31, 1922
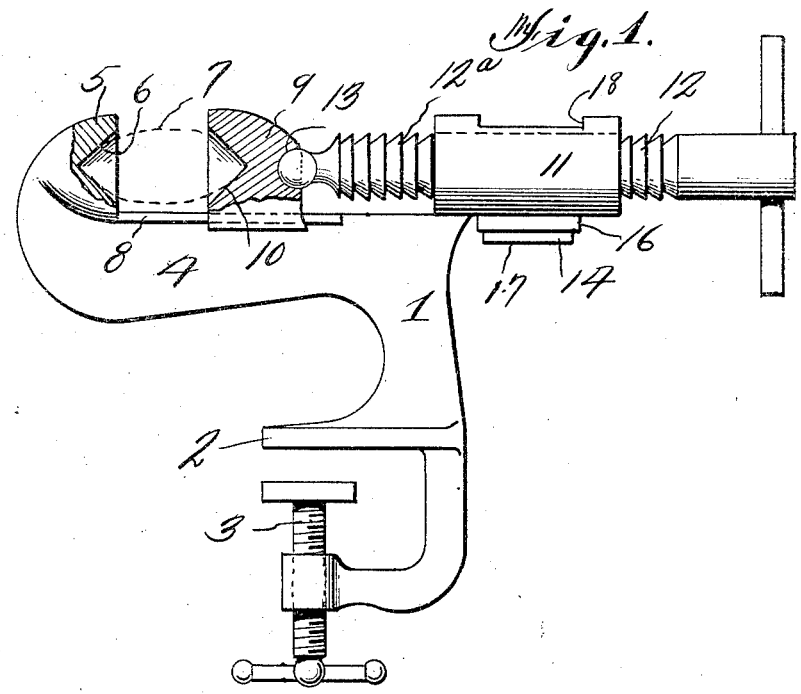
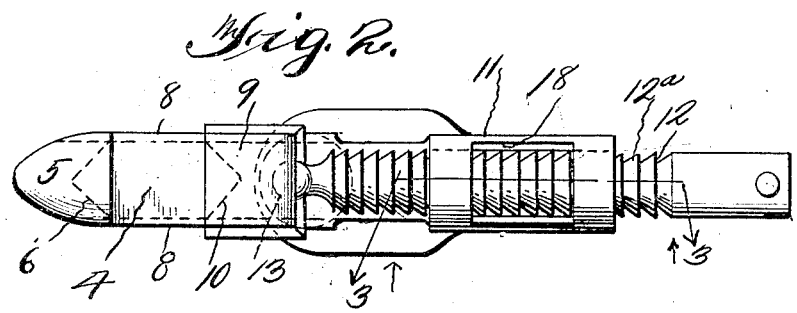
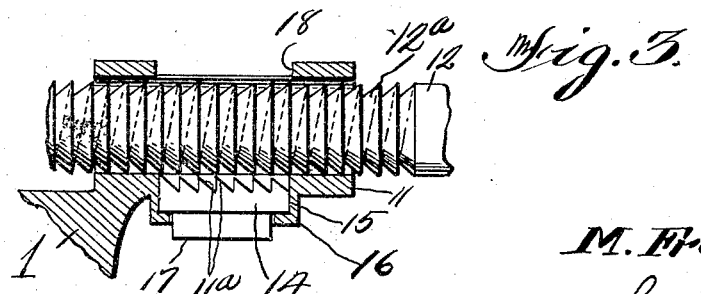
Inventor
M. French
By D. Swift
Attorney Patented Feb. 17, 1925.

1,526,593

UNITED STATES PATENT OFFICE.

MORRIS FRENCH, OF WACO, TEXAS.

NUTCRACKER.

Application filed January 31, 1922. Serial No. 532,946.

*To all whom it may concern:*

Be it known that I, MORRIS FRENCH, a citizen of the United States, residing at Waco, in the county of McLennan, State of Texas, have invented new and useful Nutcrackers; and I do hereby declare the following to be a full, clear, and exact description of the invention, such as will enable others skilled in the art to which it appertains to make and use the same.

The invention relates to nut crackers, and has for its object to provide a device of this character comprising a horizontally disposed member having a jaw thereon, a slidable jaw carried by the horizontally disposed member and cooperating with the first mentioned jaw. Also to provide a screw pivoted to the slidable jaw and rotatably and slidably mounted in a sleeve, said sleeve having movable therein a toothed member adapted to be moved into engagement with the thread of the screw after the slidable jaw and screw have been moved inwardly for holding a nut. Also to provide the screw with a handle member whereby it will be rotated after being adjusted.

A further object is to provide the device with means whereby it may be secured to a support.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of the nut cracking device, parts of the jaw being broken away.

Figure 2 is a top plan view.

Figure 3 is a detail sectional view through the screw sleeve taken on line 3—3 of Figure 2.

Referring to the drawings, the numeral 1 designates the body of the device, the lower end of which is provided with an arm 2 adapted to engage one side of the support and be held in close engagement therewith by means of the adjusting screw 3. The body portion 1 is provided with a horizontally disposed arm 4 which terminates in upwardly extending recessed jaw 5 in the recess 6 of which one end of the nut 7 is received. Slidably mounted on horizontally disposed guide ribs 8 extending outwardly from the arm 4 is a slidable jaw 9 having a recess 10 therein, which recess receives one end of the nut 7 of the jaw 9 which when forced in the direction of the jaw 5 breaks the nut. Formed integral with the body 1 is a sleeve 11, which is horizontally disposed and has rotatably and slidably mounted therein a feed screw 12. The forward end of the feed screw 12 is pivotally connected at 13 to the slidable jaw 9, and when rotated feeds the jaw 9 in the direction of the jaw 5, that is when the teeth 11ª of the block 14 are in engagement with the threads 12ª on the feed screw 12. The block 14 drops by gravity to the bottom of the chamber 15 in the extension 16 of the sleeve 11 and the teeth consequently are normally out of engagement with the threads 12ª of the feed screw 12.

When it is desired to crack a nut, the nut is placed between the jaws 5 and 9, then the feed screw 12 is moved inwardly until the ends of the nut are received in the recesses 6 and 10 of the jaws, after which the operator places the finger in engagement with the under side 17 of the block 14 and forces the same upwardly until the teeth 11ª are in engagement with the threads 12ª at which time the rotation is imparted to the feed screw 12, which will force the same inwardly and cause the nut 7 to be cracked by the movement of the jaw 9 in the direction of the jaw 5. By providing the gravity actuated block 14, it will be seen that the jaws 5 and 9 may be easily placed in position to engage the ends of various sizes of nuts without rotating the feed screw 12 and that when the block is in its upper position that all of the force of the screw 12 may be easily obtained with the minimum amount of rotation of the screw and nuts easily and quickly cracked. The upper side of the sleeve 11 is provided with an opening 18 through which the block 14 may be passed to a position in the chamber 15.

The outstanding horizontal extension or sleeve 16 is adapted to be grasped by one hand of the operator, while the other hand is used for rotating and sliding the screw, and the toothed block 14 which is dropped into and seated within the chamber or depression 15 at the bottom of the sleeve is retained in said depression by the screw which extends over the block. The reduced portion 17 of the block which depends through the opening at the bottom of the depression, which is of smaller size than the depression itself, can be lifted by the hand which grasps the sleeve or extension 16. This provides for the convenient operation of the device, one hand grasping the sleeve or extension 11, while the other hand is used for turning and sliding the screw, thus enabling maximum manual power to be applied in a convenient manner, and by opening and closing the hand which embraces the sleeve 11, the block 14 can be lowered and raised.

The invention having been set forth what is claimed as new and useful is:—

A nut cracker comprising a body having a fixed jaw and an outstanding horizontal sleeve adapted to be grasped by one hand of the operator, a screw slidable through said sleeve, a jaw movable with said screw and cooperable with the aforesaid jaw, the bottom of the sleeve having a depression and an opening of smaller size than the depression at the bottom of said depression, and a toothed block seated in said depression under the screw to be raised in engagement with the screw and having a reduced portion depending through said opening to be lifted by the hand which grasps the sleeve.

In testimony whereof I have signed my name to this specification in the presence of two subscribing witnesses.

MORRIS FRENCH.

Witnesses:
J. L. ORAND,
F. E. HOBBS.